(12) United States Patent
Yalla et al.

(10) Patent No.: US 10,748,526 B2
(45) Date of Patent: Aug. 18, 2020

(54) AUTOMATED DATA CARTRIDGE FOR CONVERSATIONAL AI BOTS

(71) Applicant: Accenture Global Solutions Limited, Dublin (IE)

(72) Inventors: Muralidhar Yalla, Bangalore (IN); Anand Vijendra, Bangalore (IN); Venugopal Ramakrishnan, Aldershot (GB)

(73) Assignee: Accenture Global Solutions Limited, Dublin (IE)

(*) Notice: Subject to any disclaimer, the term of this patent is extended or adjusted under 35 U.S.C. 154(b) by 43 days.

(21) Appl. No.: 16/114,678

(22) Filed: Aug. 28, 2018

(65) Prior Publication Data
US 2020/0074991 A1 Mar. 5, 2020

(51) Int. Cl.
| | |
|---|---|
| *G10L 15/18* | (2013.01) |
| *G06F 40/284* | (2020.01) |
| *G06F 40/247* | (2020.01) |
| *G06F 40/268* | (2020.01) |
| *G10L 15/06* | (2013.01) |
| *G10L 15/22* | (2006.01) |

(52) U.S. Cl.
CPC ........ *G10L 15/1815* (2013.01); *G06F 40/247* (2020.01); *G06F 40/268* (2020.01); *G06F 40/284* (2020.01); *G10L 15/063* (2013.01); *G10L 15/22* (2013.01); *G10L 2015/225* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,099,426 A | * | 3/1992 | Carlgren | G06F 16/319 704/9 |
| 8,219,599 B2 | * | 7/2012 | Tunstall-Pedoe | G06F 16/24534 707/603 |
| 9,606,980 B2 | * | 3/2017 | Andrejko | G06F 40/56 |

(Continued)

OTHER PUBLICATIONS

Shah et al, Generating Sentences Using a Dynamic Canvas, Association for the Advancement of Artificial Intelligence, Jun. 13, 2018, pp. 1-8 (Year: 2018).*

(Continued)

*Primary Examiner* — Linda Wong
(74) *Attorney, Agent, or Firm* — Brinks Gilson & Lione

(57) ABSTRACT

A system may obtain a test utterance sample configured to test a virtual agent. The system may tokenize the test utterance sample into a sample tokens. The system may determine, based on a natural language processing framework, a synonymous set (synset) for at least one of the sample tokens. The synset may include a lemma tokens. The system may obtain a contextual corpus relevant to a natural language context of the virtual agent. The system may select a lemma token that is included in the corpus tokens. The system may generate a new test utterance comprising the selected lemma token. The system may insert the new test utterance in a test repository. The system may communicate the new test utterance to the virtual agent to test the virtual agent based on the new test utterance. If the virtual agent fails a test in respect to the new test utterance, the corpus of the virtual agent can be retrained.

20 Claims, 5 Drawing Sheets

(56) References Cited

U.S. PATENT DOCUMENTS

| | | | | |
|---|---|---|---|---|
| 10,325,026 | B2* | 6/2019 | Cardillo | G06F 40/211 |
| 2008/0120093 | A1* | 5/2008 | Izumida | G10L 13/06 |
| | | | | 704/10 |
| 2009/0228482 | A1* | 9/2009 | Ye | G06F 16/951 |
| 2011/0307241 | A1* | 12/2011 | Waibel | G06F 40/58 |
| | | | | 704/2 |
| 2014/0180688 | A1* | 6/2014 | Kwon | G10L 15/06 |
| | | | | 704/236 |
| 2016/0170972 | A1* | 6/2016 | Andrejko | G06F 40/56 |
| | | | | 704/9 |
| 2016/0365086 | A1* | 12/2016 | Osawa | G06F 40/205 |
| 2017/0228456 | A1* | 8/2017 | Alter | G06F 40/30 |
| 2017/0316775 | A1* | 11/2017 | Le | G10L 15/16 |
| 2019/0080688 | A1* | 3/2019 | Itsui | G10L 15/197 |
| 2019/0164064 | A1* | 5/2019 | Li | G06F 16/3329 |
| 2019/0197105 | A1* | 6/2019 | Tagra | G06F 40/117 |
| 2019/0362710 | A1* | 11/2019 | Yannam | G06F 40/30 |

OTHER PUBLICATIONS

Chung, E., et al., "Sentence-Chain Based Seq2seq Model for Corpus Expansion," dated Aug. 7, 2017, pp. 455-466, ETRI Journal, vol. 39, No. 4, https://doi.org/10.4218/etrij.17.0116.0074, ETRI, Daejeon, Rep. of Korea.

Extended European Search Report, dated Dec. 20, 2019, pp. 1-9, issued in European Patent Application No. 19188459.2, European Patent Office, Berlin, Germany.

Kolomiyets, O., Bethard, S., Moens, M-F., "Model-Portability Experiments for Textual Temporal Analysis," dated Jun. 19, 2011, pp. 271-276, Proceedings of the Association of Computational Linguistics:shortpapers, Portland, Oregon, Jun. 19-24, 2011; XP055651869; Available at URL: https://www.aclweb.org/anthology/P11-2047.

Zhang, X., LeCun, Y., "Text Understanding from Scratch," dated Feb. 5, 2015, pp. 1-10, XP055651849, available at URL: https://arxiv.org/pdf/1502.01710.

Wang, W., Yan, D., "That's so Annoying!!!: A Lexical and Frame-semantic Embedding Based Data Augmentation Approach to Automatic Categorization of Annoying Behaviors using #petpeeve Tweets,*" dated Sep. 17, 2015, pp. 2557-2563, Proceedings of the 2015 Conference on Empirical Methods in Natural Language Processing, Lisbon, Portugal, Sep. 17-21, 2015; XP055651853; DOI 10.18653/v1/D15-1306.

Kobayashi, S., "Contextual Augmentation: Data Augmentation by Words with Paradigmatic Relations," dated May 16, 2018, pp. 1-6, arxiv.org, Cornell University Library, Ithaca, NY, XP08087844.

* cited by examiner

AUTOMATED DATA CARTRIDGE FOR CONVERSATIONAL AI BOTS

TECHNICAL FIELD

This disclosure relates to artificially intelligent virtual agents and, in particular, to computer-generated testing of artificially intelligent virtual agents.

BACKGROUND

Virtual agents, such as chatbots, emailbots, salesbots, and/or AI assistants, may be deployed with intelligent algorithms working in the background to assist users with inquiries and provide suggestions, directions, and/or other useful information. When users are interacting with the virtual agent, the virtual agent interprets and responds to natural language utterances. A virtual agent under test may be trained with various conversational scenarios to increase the accuracy and authenticity of the virtual agent. Present approaches to conversationally testing and training virtual agents involve manual effort to generate test data with limited test coverage.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
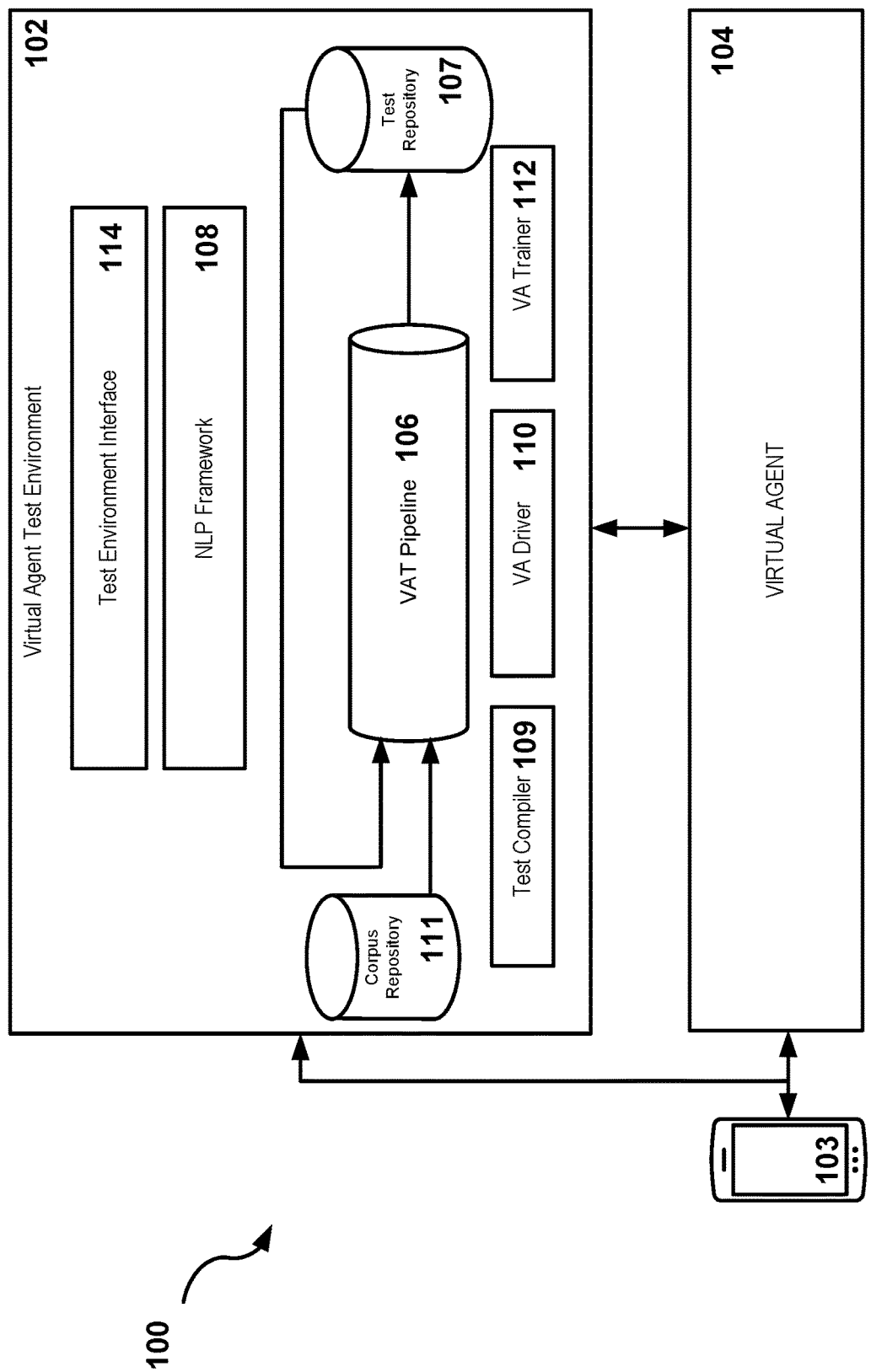
FIG. 1 illustrates an example of a natural language test compilation system.

Virtual agents, such as chatbots, emailbots, salesbots, AI Assistants, may be deployed with intelligent algorithms working in the background to assist users with inquiries and provide suggestions, directions, and other useful information. When users are interacting with the virtual agent, the virtual agent may interpret and respond to natural language utterances, which may include voice or test based natural language input. A virtual agent under test may be trained with various conversational scenarios to increase the accuracy and authenticity of the virtual agent. Virtual agent developers design the virtual agent to handle a variety of possible utterances input to the virtual agent. However, conceiving or creating a large corpus of possible utterances for training the virtual agent may be restricted due to limited human resources, time constraints, and the large demand placed on computing resources. Developing, training, and testing virtual agents may involve substantial amounts of time and computing resources. Moreover, inadequate test coverage may result in erroneous and/or inauthentic responses from virtual agents.

Accordingly, disclosed herein are digital systems and methods for generating and compiling conversational test utterances for virtual agents based on natural language processing and machine learning. By way of an introductory example, the system may obtain a test utterance sample from utterance samples configured to test a virtual agent. The system may tokenize the test utterance sample into sample tokens. The system may determine, based on a natural language processing framework, a synonymous set (synset) for at least one of the sample tokens. The synset may include lemma tokens that are synonymous with the at least one of the sample tokens. The system may obtain a contextual corpus comprising corpus tokens. The system may select, from the lemma tokens, a lemma token that is included in corpus tokens. The system may generate a new test utterance comprising the selected lemma token. The system may generate a semantic relationship score. The semantic relation metric may be indicative of semantic correspondence between the new test utterance and the test utterance sample. The system may insert, in response to the semantic relation metric being greater than a threshold value, the new test utterance in a test repository. The system may communicate the new test utterance to the virtual agent to test the virtual agent based on the new test utterance. If the virtual agent fails a test in respect to the new test utterance, the corpus of the virtual agent can be retrained.

One example of a technical advancement achieved by the systems and methods described herein may be that test coverage for virtual agents may be increased by automatically generating test utterances for the virtual agent. For example, a word in a test utterance may be replaced with a lemma included in a synset for the word. Multiple computer-generated test utterances may be generated from possible derivatives of the original test utterance by replacing the words with respective lemmas.

Another example of a technical advancement achieved by the systems and methods described herein may be that a library of test utterances may be compiled for virtual agents operating in a particular linquistical context. For example, a contextual corpus may include highly specialized words that are specific to a particular industry, organization, and/or group of people. Test utterances may be generated and/or compiled based on a test utterance sample and the words that make up the contextual corpus. The generated test utterances may be associated with a contextual identifier. The generated test utterances may be quickly identified based on the contextual identifier for inclusion as test input for one or more virtual agents that operate in a particular context.

Another example of a technical advancement achieved by the systems and methods described herein include increases in test coverage while decreasing memory demands and processing time. For example, generating lemmas, synonymous sentences, and other NLP operations may involve processor and memory intensive natural language processing. The contextual test corpus may provide a basis to prioritize which sample tokens of a test utterance should be varied to achieve higher test coverage. Alternately or in addition, the contextual corpus may be accessed to remove certain irrelevant or improper lemmas from consideration to generate a contextually relevant test utterance. Filtering lemmas and prioritizing sample tokens in the test utterance may simultaneously reduce the processing time and storage requirements for compiling test utterances. Additionally, the systems and methods therein may eliminate or reduce the need for subsequent testing. Accordingly, computer processing speed may be increased, memory utilization may be reduced, computing resources conserved, and/or virtual agent test coverage may be increased according to the technical advancements described herein. Additional benefits, efficiencies, and improvements over existing market solutions are made evident in the systems and methods described below.

FIG. 1 illustrates an example of a natural language test compilation system 100. The system 100 may include a virtual agent test environment 102. The virtual agent test environment 102 may communicate with a virtual agent 104. The virtual agent test environment 102 may generate or compile test utterances tailored to exercise the linguist semantics and trained natural language model(s) developed for the virtual agent 104. Alternatively or in addition, the virtual agent test environment 102 may build and maintain a database of utterances and test data libraries that can be complied and deployed during development and testing of one or more virtual agents.

The virtual agent 104 may include an artificial conversation entity that conducts computer-automated intelligent conversation. The virtual agent 104 may include a service or logic configured to receive natural language input and to respond to the natural language input using artificial intelligence (AI). The virtual agent 104 may include, for example, a chatbot, an emailbot, a salesbots, an AI assistant, and/or any other kind of system configured to provide computer-automated intelligent conversation. The virtual agent 104 may provide intelligent conversation with one or more users. Alternatively or in addition, the virtual agent 104 may lead, initiate, and/or engage in intelligent conversation. For example, the virtual agent 104 may respond to questions and/or statements communicated to the virtual agent 104 by the one or more users. The intelligent conversations may include text communications and/or voice communications. The virtual agent 104 may be deployed to and/or configured on a hosted cloud platform. The hosted cloud platform may include one or more physical and/or logical servers that are built, hosted and/or delivered over a communications network. In some examples, the virtual agent 104 may communicate with a device 103, or multiple devices, to send and receive natural langue text or audio.

The virtual agent test environment 102 may further include a virtual agent test generation pipeline (VAT pipeline) 106. The VAT pipeline 106 may generate one or more test utterance samples. In some examples, the VAT pipeline 106 may receive one or more test utterance samples from a user interface. In other examples, the VAT pipeline 106 may receive one or more previously generated test utterances from a test repository 107. The test repository 107 may store multiple test utterances. The test repository 107 may associate the test utterances with certain identifiers, flags, and types in order to group the test utterances. For example, the one or more test utterances may be associated with a context identifier for a natural language context, a virtual agent identifier, expected test results, and other information described herein.

A test utterance may include a group of words that convey a statement, question, exclamation, command, and/or an intent. For example, the test utterance may include a full or partial sentence. The sentence may include natural language information encoded in text, audio, and/or a combination thereof. A test utterance sample may refer to test input that provides a basis to generate additional test utterances, as described herein. For example, a test utterance sample may include a test utterance provided via a user interface. Alternatively or in addition, a test utterance sample may include a computer-generated test utterance that was previously complied.

VAT pipeline 106 may receive a contextual corpus. For example, the virtual agent test environment 102 may include a corpus repository 111 that includes one or more contextual corpus. Alternatively or in addition, the VAT pipeline 106 may access a web page to download the contextual corpus from a website. For example, the VAT pipeline 106 may access a web server via a URL such as HTTP and/or an Application Programming Interface (API) call to obtain the contextual corpus. The VAT pipeline 106 may access the web server directly, download the contextual corpus and/or store the contextual corpus in the corpus repository 111. In other examples, the VAT pipeline 106 may load the contextual corpus from a file or multiple files. In further examples, the context contextual corpus may include one or more computer-generated test utterances previously output by the VAT pipeline 106.

A contextual corpus may include text related to a particular natural language context or contexts. For example, the contextual corpus may include a group of words, sentences, grammars, expressions, and/or other information that originated in an article, web page, conversation, or any other source that provides information related to a particular industry, organization, purpose, and/or branch of knowledge. The contextual corpus may be associated with context identification information descriptive of the lexicon, linguistics, and/or semantics of a particular industry, organization, vocabulary, virtual agent 104, and/or other source of the contextual corpus. Alternatively, the contextual text corpus may include one or more utterances received from a device in communication with one or more virtual agents. For example, communications between the device 103 and the virtual agent 104 may be monitored and utterances may be stored in the corpus repository 111 and/or provided to the VAT pipeline 106.

The VAT pipeline 106 may generate one or more computer generated test utterances based on the test utterances and/or the contextual corpuses received by the VAT pipeline 106. The computer-generated test utterances may have the same intent and/or meaning as the test utterance supplied to the VAT pipeline 106, but one or more varied words based on the words in the contextual corpus. For example, one or more words of the test utterance may be replaced with one or more lemmas.

As described herein, a lemma may refer to a word with related meaning to an origin word. For example, a lemma may include a synonym of a word. Lemmas may be arranged in synonym sets (synsets). The lemmas of a synset may refer to a group of words that are synonymous with the origin word. A lemma may include the word text, part-of-speech (POS) tags, and/or other information that identifies how a word may be used in a particular natural language context.

The VAT pipeline 106 may store test utterances in the test repository 107. The complied test utterances may be associated with a context identifier, a virtual agent (104) identifier, a test case identifier, and/or a group identifier that organizes the test utterances based on a particular natural language context or test case.

The virtual agent test environment 102 may further include a natural langue processing (NLP) framework 108, or multiple NLP frameworks. The NLP framework 108 may provide tokenization, POS tagging, lemmatization and/or other natural language processing capabilities. The NLP framework 108 may include, for example, Natural Language Tool Kit (NLTK), Open NLP, Stanford NLP, and/or any other suitable NLP framework 108. In some examples, the capabilities provided by the NLP framework 108 may involve processor and/or memory intensive operations. The VAT pipeline 106 may efficiently access the NLP framework 108, or implement NLP capabilities, to quickly compile test utterances that accurately and efficiently test the virtual agent 104.

The virtual agent test environment 102 may further include a test compiler 109. The test compiler 109 may generate a test library, or libraries, that comprises associations to test utterances. For example, the test compiler 109 may compile test utterances based on contextual identification information. In an example, the test compiler 109 may receive a contextual identifier. The contextual identifier may include an identifier of a particular natural language context. The virtual agent 104 may perform natural language understanding according to the particular natural language context. The natural language context may include, for example, a linguistic and/ semantic context for a particular industry, organization, purpose, and/or branch of knowledge. The test compiler 109 may select one or more test utterances based on the contextual identifier. Accordingly, the test compiler 109 may compile test utterances that are tailored for the natural language context of one or more virtual agents.

Alternately or in addition, the test compiler 109 may compile a library of test utterances for multiple natural language contexts. In an example, the test utterances may be associated with a "pharmaceutical" identifier. The test compiler 109 may receive a request to compile test utterances related to a natural language context associated with the pharmaceutical industry. In response, the test compiler may select test utterances associated with the "pharmaceutical" identifier.

In some examples, the test compiler 109 may associate a compiled test library with one or more virtual agents. For example, the test compiler 109 may store the test library in the test repository 107 and associate the test library with an identifier of the virtual agent 104. The test library may be re-used for the virtual agent 104 when the circumstances warrant re-testing the virtual agent 104 due to, for example, redevelopment, updates, or the like. Alternately or in addition, the test library may be re-used for other virtual agents that operate in a similar natural language context.

The virtual agent test environment 102 may further include a virtual agent driver (VA driver) 110. The VA driver 110 may test the virtual agent 104 according to test utterances compiled for a particular natural language context. For example, the VA driver 110 may receive a contextual identifier and/or virtual agent identifier. The contextual identifier may identify a particular context in which the test utterances were tailored for. The VA driver 110 may select one or more test libraries and/or test utterances for the virtual agent 102 based on the virtual agent and/or context identifier. The VA driver 110 may communicate the test utterances to the virtual agent 104. Accordingly, the test utterances may be tailored for the virtual agent 104 and/or the context in which the virtual agent 104 operates.

In some examples, the VA driver 110 may receive a test result from the virtual agent 104. The VA driver 110 may store the test result in the test repository 107, or some other repository. The VA driver 110 may associate the test result with an identifier of the virtual agent 104 and/or an identifier of the test utterance.

In some examples, the test utterances may be associated with an expected result. For example, the test environment interface 114 may display one or more test utterances and receive expected results for the test utterances. The expected results may be indicative of the results that are expected for a particular test utterance. In some examples, the expected results may include the expected text received from the virtual agent 104. Alternately or in addition, the expected result may include the intent of a response utterance received from the virtual agent 104. The expected responses may be associated with the test utterances in the test repository 107, or some other repository.

The virtual agent test environment may further include a virtual agent trainer (VA trainer) 112. The VA trainer 112 may compare the expected test results to test utterances with actual responses. The VA trainer 112 may determine that the expected responses do not corresponding to, match, or substantially match the actual responses. The VA trainer 112 may retrain the trained corpuses of the virtual agent 104 based on the test utterance. In some examples, the test environment interface 114 may receive various annotations, such as POS annotations, related to a test utterance that cause the NLP framework 108, or some other NLP framework retrain to the virtual agent 104, to retrain the trained corpuses of the virtual agent 104 based on the test utterance. In some examples, the test environment interface 114 may display test utterances that have been flagged due to a failed test, and the test environment interface may receive training annotations for the test utterance to re-train the virtual agent 104.

The virtual agent test environment may further include a test environment interface 114. The test environment interface 114 may receive the test sample utterances and/or the contextual corpus. In other examples, test environment interface 114 may receive source identifying information, such as web addresses or file locations, corresponding to the location of the test sample utterances and/or the contextual corpus. Alternately or in addition, test environment interface 114 may receive parameters that define how to compile one or more library of test utterances. For example, the test environment interface 114 may receive a contextual identifier, a desired number of test utterances, tunable parameters for generating new test utterances, and/or other information that is used to compile and/or organize the test utterances.

Figure 2:
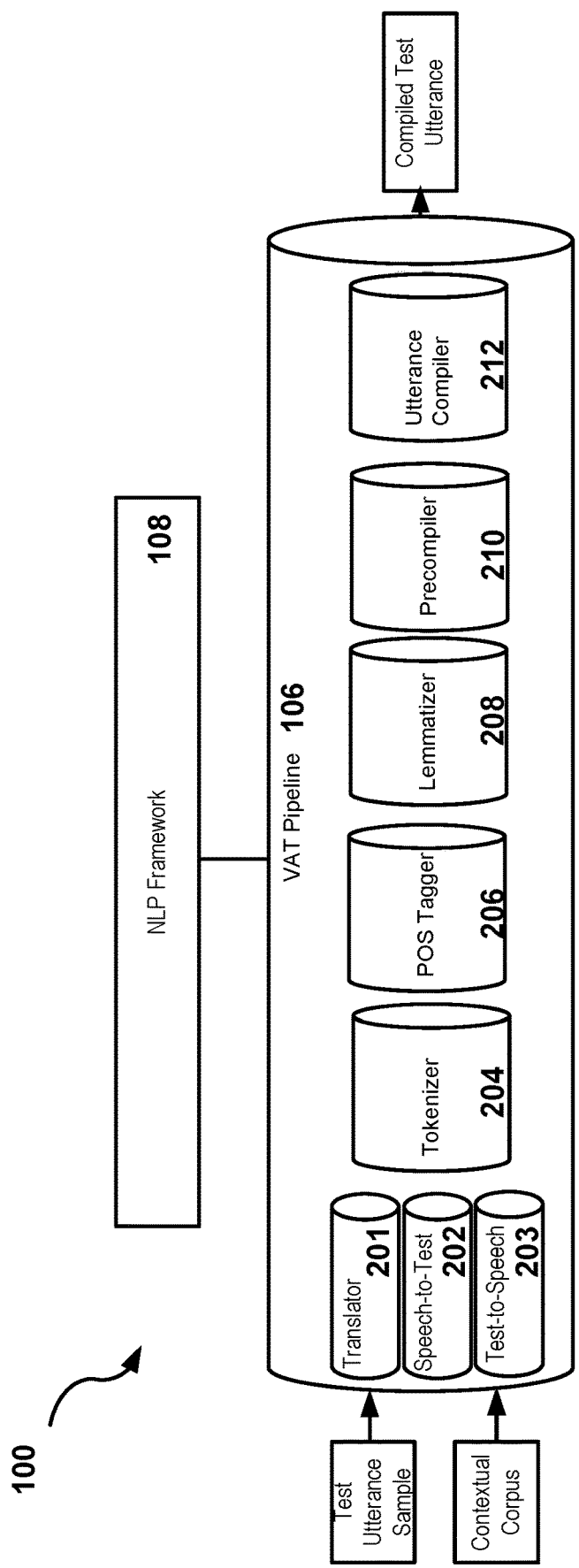
FIG. 2 illustrates an example of the virtual agent test generation pipeline for a system.

FIG. 2 illustrates an example of the VAT pipeline 106 for the system 100. The VAT pipeline 106 may receive a test utterance sample and/or a contextual corpus. In some examples, the VAT pipeline 106 may include and/or access, a translator 201. The translator 201 may convert the test utterance and/or contextual corpus from one language into a different target language, for example, from French to English. Alternatively or in addition, the translator 201 may convert the test utterance and/or contextual corpus from a target language to an intermediate language and then back to the target language. The translation between languages may introduce a variance in one or more constituent words. For example, a test utterance may include the phrase "What is the balance of my account" before the translation and after the translation the test utterance may be modified to the equivalent of "How much do I owe on my account?" The translator 201 may perform the translation. Alternatively, the translator 201 may access the NLP framework 108, or a cloud-based translation service, to perform the translation. In some examples, multiple translation services may generate multiple variations in the constituent words of a test utterance sample and/or contextual corpus.

The VAT pipeline 106 may include a tokenizer 204. The tokenizer 204 may tokenize the test utterance and/or the contextual corpus input a plurality of tokens. The tokens may be representative of words in a sentence or partial sentence. For example, the tokenizer 204 may separate the words based on a delimiter, such as a white spaces between groups of characters. In other examples, the tokenizer 204 may access trained natural language model to perform tokenization. Alternatively or in addition, the tokenizer 204 may communicate with the NLP framework 108 to perform the tokenization.

A token may refer to a sequence of characters in some particular document that are grouped together as a semantic unit. For example, a token may include text representative of a word according to a particular language, grammar, or other semantic rules. A token may be identified in a text segment may be identified based on, for example, white spaces, punctuation, and/or other characters or groups of characters. Alternatively or in addition, a token may be identified based on a trained corpus and/or a natural language processing framework.

The VAT pipeline 106 may include a part-of-speech (POS) tagger 206. The POS tagger 206 may receive tokenized input and tag tokens with POS tags. The POS tags may be indicative of the part of speech such as noun, verb, adjective, etc. Alternatively or in addition, the POS tags may be indicative of grammatical categories such as tense, number (plural/singular), case etc. The POS tags may be derived from a tag set such as the Penn Treebank or some other suitable tag set.

The VAT Pipeline 110 may further include a lemmatizer 208. The lemmatizer 208 may determine a synset or multiple synsets for a particular token or tokens. For example, the test utterance sample may include a plurality of sample tokens. The lemmatizer 208 may determine a synset for one or more of the sample tokens. The synset may include a plurality of lemmas associated with the sample token. The VAT pipeline 106 may communicate with the NLP framework 108 to perform the lemmatization.

The VAT pipeline 106 may further include a precompiler 210. The precompiler 210 may prepare the test utterance sample, the contextual corpus, and/or the extracted lemmas for complication of a new test utterance. The precompiler may reduce the processing time required to generate compiled test utterances, reduce the memory requirements for generating and/or storing compiled test utterances, and/or improve the test coverage and test accuracy of the compiled test utterances. For example, the precompiler 210 may filter stop words and/or other words that are irrelevant to a particular test context from the test utterance sample and/or the contextual corpus. Alternately or in addition, the precompiler 210 may filter and discard certain lemmas, which are irrelevant to a natural language context based on the frequency distribution of words included in the contextual corpus. Alternately or in addition, the precompile may maintain and access restricted sets of lemmas to determine whether a lemma should be discarded from consideration when generating new test utterances. Alternately or in addition, the precompiler 210 may prioritize the sample tokens in the test utterance sample based on the frequency of the sample token in the contextual corpus.

The VAT pipeline 106 may further include an utterance compiler 212. The utterance compiler 212 may generate one or more new test utterances based on the test utterance samples, detected lemmas/synsets, and/or the contextual corpus. For example, the utterance compiler 212 may replace a sample token in the test utterance sample with a corresponding lemma for the sample token. Alternatively or in addition, the utterance compiler 212 may generate sentence synonyms.

In some examples, the utterance compiler 212 may identify only a subset of the sample tokens included in the test utterance sample for replacement. For example, the precompiler 210 may prioritize the sample tokens based on the frequency of the sample tokens in the contextual corpus. The precompiler 210 may select the sample tokens associated with a frequency value higher than a threshold priority value. The precompiler 210 may replace the selected tokens with corresponding lemmas while leaving the remaining sample tokens unchanged.

In some examples, the utterance compiler 212 may further analyze the generated test utterances using NLP techniques. For example, compiled test utterances may be subjected to various algorithms like Recursive Descent parsing, Shift Reduce Parsing, etc., to extract the sentence grammar. The utterance compiler 212 may generate a well-formed sub-string (WFST) table to substitute synonyms or suitable words in the test utterance.

In some examples, the utterance compiler 212 may generate a sentence relation metric. For example, the utterance compiler 212 may perform sentence similarity analysis based on the test utterance sample and the generated test utterance to ensure that the intent, keywords, and/or meanings are maintained. The sentence relation metric may include a statistical metric, such as a correlation, that represents a measure of the similarity of two sentences in terms of intent, keywords, and/or meanings. For example, the synsets of POS tagged words in original sentence may be compared with the synsets of POS tagged words in a generated sentence. The natural language framework 108 may provide a comparison features, such as path_similarity( )with NLTK, which provides a score value between 0 and 1. The maximum returned score for each word is aggregated if not NULL and a counter is incremented. The ratio of the aggregate and the count of matching words returning a non-NULL score may provide a sentence relation metric. Generated sentences that have a sentence relation metric greater than a similarity metric threshold, such as 0.5 and greater, may be considered for generation.

Figure 3:
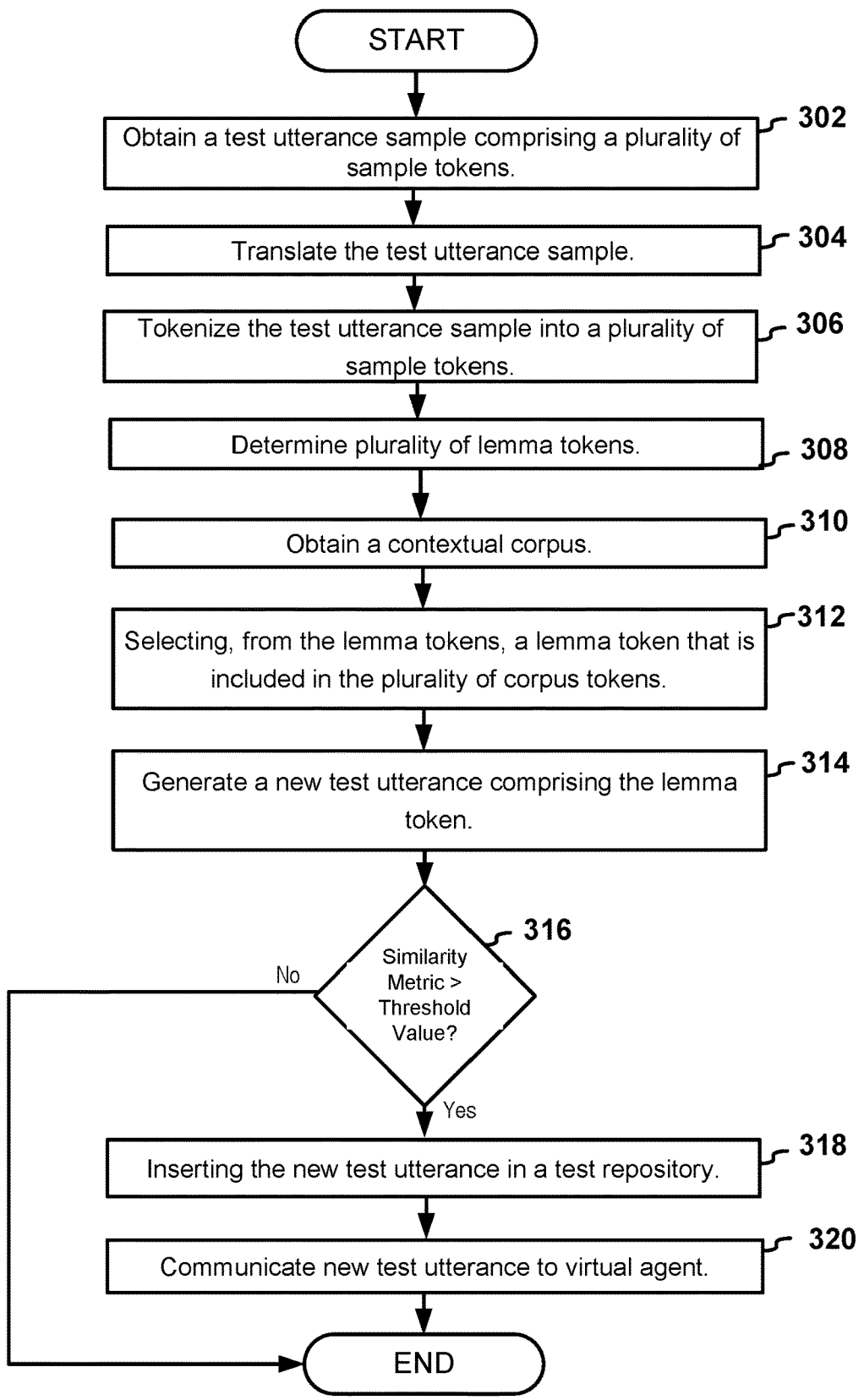
FIG. 3 illustrates a first flow diagram of an example of logic for a system.

FIG. 3 illustrates a first flow diagram of an example of logic for the system 100. The VAT pipeline 106 may obtain a test utterance sample comprising a plurality of test tokens (302). The test utterance sample may include a sentence or a partial sentence. Alternatively or in addition, the test utterance may include audio and/or text. When the test utterance includes audio, the VAT pipeline 106 may access a speech-to-text processor 202 to convert the audio to text. In examples, the VAT pipeline 106 may first convert the text to audio with a text-to-speech processor 203. The audio may be generated so as to employ dialects and/or accents of a particular language. The VAT pipeline may subsequently convert the audio back to text. The text that was converted from the audio may include different synonyms, lemmas, and grammatical variations that may be used for additional test utterances generated by the VAT pipeline. In other examples, the test utterances, either supplied to the VAT pipeline or generate by the VAT pipeline may be converted to audio and stored in the test repository.

In some examples, the VAT pipeline 106 may access the test utterance sample from the test repository 107. For example, the test utterance sample may include a previously generated test utterance compiled by the VAT pipeline 106. Alternatively or in addition, the test utterance sample may be received by the test environment interface 114. For example, the test utterance sample may be input by a user or device in communication with the test environment interface 114.

The translator 201 may translate the test utterance sample (304). For example, the utterance may be received in a first language. The translator 201 may translate the test utterance into a second language. Alternatively or in addition, the translator 201 may translate the test utterance from the first language, to the second language and then back to the first language. Translations may introduce variances in the words of the utterance. The variances may include different synonyms, lemmas, and grammatical variations that may be used for additional test utterances generated by the VAT pipeline 106.

The tokenizer 204 may tokenize the test utterance sample into a plurality of sample tokens (306). For example, the tokenizer 204 may apply natural language processing to the test utterance sample to identify the words, phrases, ordinal numbers, and other groupings of characters in the test utterance sample. In some examples, the POS tagger 206 may further tag the tokens identified by the tokenizer 204 based on a tag set, such as a Penn Treebank tag set.

The lemmatizer may determine a plurality of lemma tokens (308). The lemma tokens may include words that have same or similar meaning of a sample token included in the test utterance sample. In some examples, generating test utterances based on all of the lemmas may result in wasted computer resources and/or inaccurate test results. Therefore, the lemmas may be filtered and/or refined based on a contextual corpus.

The precompiler 210 may obtain the contextual corpus (310). In some examples, the contextual corpus may be previously tokenized and/or POS tagged. Alternately or in addition, the contextual corpus may be tokenized and/or POS tagged. In some examples, the VAT pipeline 106 may be provided with a contextual identifier. The precompiler 210 may select a contextual corpus based on the contextual identifier.

The precompiler 210 may select, from the lemma tokens, a lemma token that is included in the corpus tokens (312). In some examples, the precompiler 210 may determine priority values for the corpus tokens. For example, the priority values may include the respective frequencies of the corpus tokens based on a frequency distribution of the contextual corpus. The precompiler 210 may remove irrelevant lemma tokens from consideration for rendering test utterances by selecting lemma tokens that correspond to words that are associated with priority values that are below a threshold priority value. For example, the precompiler 210 may filter the lemmas and remove the lemmas that match corpus tokens that are in the bottom 50% of the prioritized corpus tokens.

Alternately or in addition, the precompiler 210 may select certain sample tokens for replacement based on priorities of the corpus tokens. For example, the precompiler 210 may identify the sample tokens that match the corpus tokens. The precompiler 210 may select the sample tokens that correspond to priority values that are higher than a threshold priority value. For example, in the test utterance sample "What is my account balance" the token "account" may match a corpus token that has a very high frequency within the contextual corpus. For example, the word "account" may be included in the top 50% of the frequency distribution of the corpus tokens. Accordingly, the precompiler 210 may flag the token "account" for replacement in the test sample utterance.

The utterance compiler 212 may generate a new test utterance comprising the lemma token (314). For example, the utterance compiler 212 may replace one or more selected samples tokens with one or more corresponding lemmas. The utterance compiler 212 may generate a semantic relation metric that is indicative of the semantic correspondence between the new test utterance and the test utterance sample.

The utterance compiler 212 may determine whether the sample relation metric is greater than a threshold similarity value (316). In response to the semantic relation metric being greater than the threshold similarity value, the utterance compiler 212 may insert new test utterance in to the test repository 107 (318). In some examples, the utterance compiler 212 may associate a contextual identifier with the new test utterance. Alternatively or in addition, the test utterance may be converted from text to audio with the text-to-speech processor 203. The audio may be recorded using dialects and/or accents that add further variation to the new test utterance, and it may subsequently be converted back to a textual representation. The new test utterance may be stored in the test repository 107 as text, audio, or a combination thereof. The VA driver 110 may communicate the new test utterance to the virtual agent 104 (320). For example, the VA driver 110 may perform coordinated testing of the virtual agent 104. The VA driver 110 may select one or more test utterances from the test repository 107 based on the context identifier associated with the test utterances. In an example, the virtual agent 104 may be used in a pharmaceutical industry. The VAT pipeline 106 may compile test utterances that are based on contextual corpuses originating from content related to the pharmaceutical industry. The compiled test utterances may be associated with a contextual identifier indicative of the pharmaceutical industry. The VA driver 110 may generate pharmaceutical-related test cases with compiled test utterances associated with the contextual identifier for the pharmaceutical industry.

Figure 4:
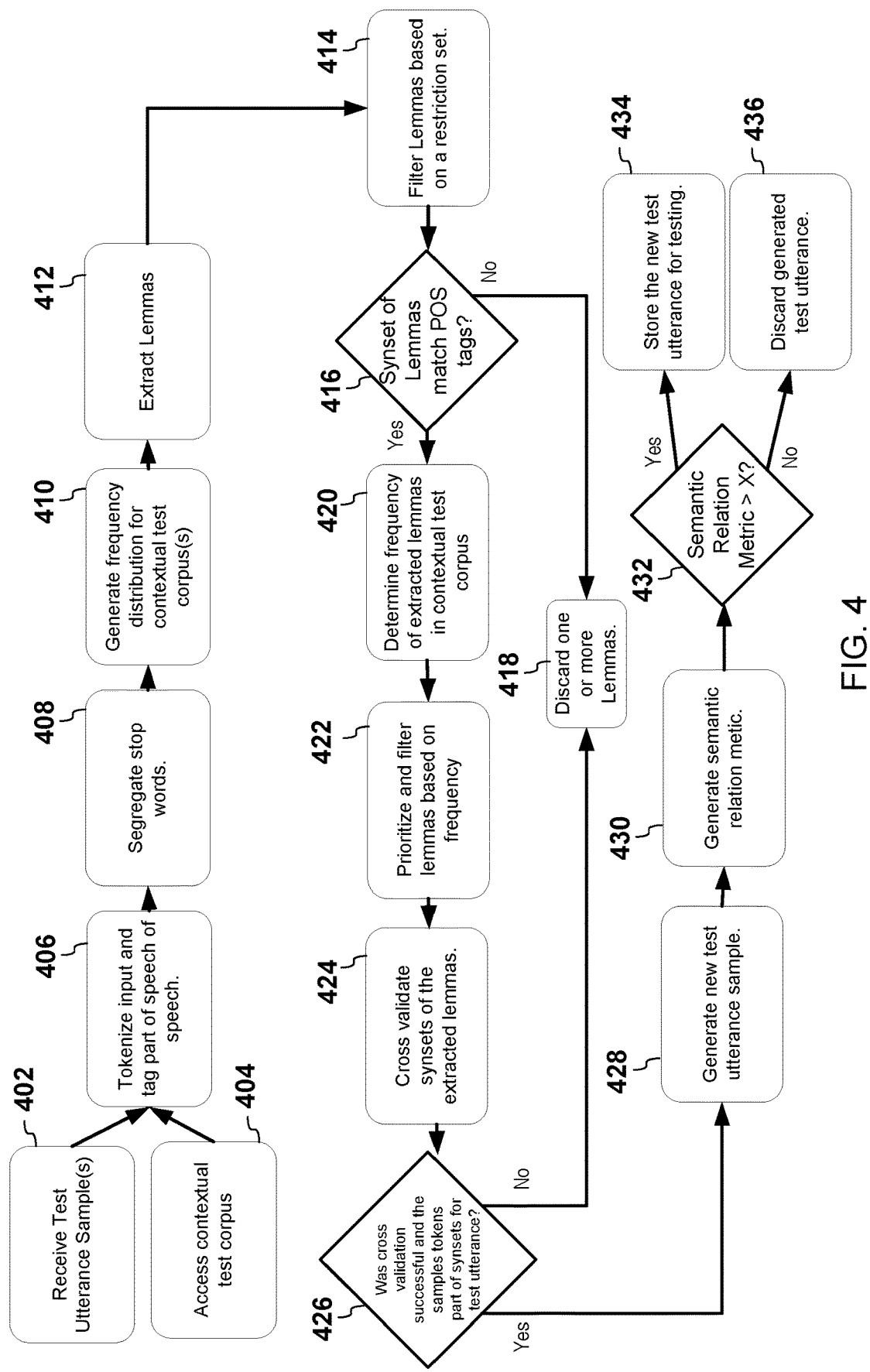
FIG. 4 illustrates a second flow diagram of an example of logic for a system.

FIG. 4 illustrates a second flow diagram of an example of logic for the system 100. The VAT pipeline 106 may receive a test utterance sample (402). In some examples, the test utterance sample may be communicated to the VAT pipeline 106 via a user interface. Alternatively or in addition, the test utterance may include a previously computer generated contextual corpus. For example, the VAT pipeline 106 may output computer-generated test utterances to the test repository 107 and then subsequently receive the computer-generated test utterance to generate a second computer-generated test utterance.

The VAT pipeline 106 may access or receive or obtain a contextual corpus (404). In some examples, the VAT pipeline 106 may access a web page to download the contextual corpus from a website. Alternatively or in addition, the VAT pipeline 106 may load the contextual corpus from a file or multiple files. The test environment interface 110 may receive a source identifier, such as a website, URL, or other source information that identifies the location of one or more contextual corpus. In other examples, the contextual corpus may include one or more computer-generated test utterances previously output by the VAT pipeline 106.

In some examples, a contextual identifier associated with the virtual agent 104 may be communicated to the VAT pipeline 106. Based on the contextual identifier, the VAT pipeline 106 may access a corpus repository 111 to retrieve the contextual test model. The contextual corpuses may be associated with the contextual identifier in the corpus repository 111 and/or the test repository 107. Therefore one or more contextual corpuses may be identified based a particular linguistics and semantics context of the virtual agent 104.

The VAT pipeline 106 may tokenize input and each token may be tagged with a POS tag (406). For example, the VAT pipeline 106 may tokenize the received test utterance sample into a plurality of sample tokens. The VAT pipeline 106 may tag each of the sample tokens with a POS tag. In some examples, the contextual corpus may be previously tokenized and tagged. Alternatively, the VAT pipeline 106 may also tokenize the contextual corpus into a plurality of corpus tokens and POS tag the corpus tokens.

The VAT pipeline 106 may segregate stop words in the test utterance sample and/or the contextual corpus (408). For example, one or more of the POS tags associated with the sample tokens of the test utterance sample may be indicative of stop words, such as "a", "the", and/or any other stop word native to NLP. In some examples, the VAT pipeline 106 may filter the stop words from the sample tokens of the test utterance sample and generate a filtered set of sample tokens for the test utterance sample. Alternatively or in addition, the VAT pipeline 106 may filter the stop words from the corpus tokens of the contextual corpus and generate a filtered set of corpus tokens for the contextual corpus.

The VAT pipeline 106 may generate a frequency distribution for the contextual corpus (410). The frequency distribution may include a model that identifies the frequency of one or more words in the contextual corpus. In some examples, the computing speed and memory requirements for generating the frequency distribution may be reduced by removing the common stop words from further processing. Alternatively or in addition, lemmas, words, phrases or other words that are restricted for a particular test case may be removed from further processing.

The VAT pipeline 106 may extract lemmas for tokens of the test utterance sample (412). For example, the VAT pipeline 106 may access the NLP framework 108 to perform lemmatization of the test utterance sample. The lemmas may provide alternative words that can be arranged or substituted in the test utterance sample to generate a new test utterance. In some examples, however, some lemmas generated for the test utterance sample may be more relevant that others with respect to testing the natural language generation and understanding of in a particular contextual corpus. Processing lemmas that are less relevant to testing the virtual agent 104 may result in wasted and/or inefficient use of computing resources including, for example, memory usage and processing power. Accordingly, the generated lemmas may for the test utterance sample may be filtered and reduced to increase test accuracy and conserve computing resources.

The systems and methods described herein provide various logic for reducing and/or filtering the lemmas generated for the test utterance sample. For example, the VAT pipeline 106 may maintain a restricted list of lemmas that may be accessed to determine whether particular lemmas should be discarded (see 414 below). Alternatively or in addition, the POS tags of the test utterance sample may compared with the lemmas to filter the lemmas into more relevant synset. (see 420 below). In other examples, the contextual corpus may be compared with the lemmas to filter the lemmas into a more relevant synset (see 418 and 420 below).

The VAT pipeline 106 may filter lemmas based on a restriction set (414). The restriction set may include tokens that have been previously identified as being irrelevant to a particular test case, context, and/or the virtual agent 104. For example, the restricted set may be stored in a repository. The restricted set and/or one or more tokens in the restricted set may associated with a context identifier, test case identifier, group identifier, and/or virtual agent identifier. The extracted lemmas from a test utterance sample may be compared with the tokens in the restricted set to determine which extracted lemmas to discard from further processing. Accordingly, maintaining the restricted set may improve processing time and reduce memory requirements for generating test utterances. Alternatively or in addition, maintaining the restricted set may increase the test accuracy of the new test utterances generated by the VAT pipeline 106.

The VAT pipeline 106 may determine whether the synset of lemmas match POS tags (416). For example, a lemma may be generated from a sample token. The sample token may be associated with a POS tag based on the sample token's linquistical use in the test utterance sample. Each of the lemmas generated from the sample token may be associated with possible POS tags, depending on various use cases and contexts of the lemma. For example, the word "Fall" in some contexts may refer to the proper noun corresponding to "Autumn". In other contexts, the word "fall" may be associated with a verb. The VAT pipeline 106 may compare the possible POS tags of a generated lemma with the POS tags of the sample token.

In response to determination that the generated lemma does not have possible POS tags that correspond to the POS tag of the sample token, the VAT pipeline 106 may discard the lemma (418). Alternatively or in addition, the VAT pipeline 106 may add the lemma to the restricted set (see 414 above). The VAT pipeline 106 may conserve computing resources by not further processing the lemma. Further, a lemma included in a generated test utterance with an improper POS may result in false negatives, false positives, or other adverse testing results. Accordingly, the test accuracy of the generated test utterances may be improved by removing lemmas that are associated with improper or irrelevant POS tags.

The VAT pipeline 106 may determine the frequency of the extracted lemmas (420). For example, VAT pipeline 106 may identify the corpus tokens in the contextual corpus that correspond and/or match the extracted lemmas. The VAT pipeline 106 may prioritize and filter the lemmas based on the frequency of the corresponding corpus tokens (422). For example, lemma A may be included in the contextual corpus 100 times and lemma B may be included in the contextual corpus 105 times. The VAT pipeline 106 may sort the lemmas in descending order based on frequency such that the most frequent lemmas are ranked higher. In some examples, the less frequent lemmas may be removed from consideration to improve processing time and/or conserve computing resources. For example, lemmas with frequencies in the bottom 50% of the frequency distribution may be discarded. In other examples, some other predetermined frequency threshold may be applied to filter the extracted lemmas. Alternatively or in addition, the frequency threshold may be tunable depending on the linguistics and semantics context of the virtual agent 104. For example, more accurate test results may be achieved by increasing the frequency threshold for virtual agents that respond to words with highly specialized meanings, such as words used in specialized technical fields. Alternatively, a greater number of test inputs may be achieved by lowering the frequency threshold.

The VAT pipeline 106 may cross validate synsets of the lemmas with the original word (424). For example, the VAT pipeline 106 may verify whether the original words in the test utterance sample are a part of the synsets of the extracted lemmas. The VAT pipeline 106 may perform this reverse validation to ensure that an original word in the test utterance sample an extracted lemma are closely matching in terms of meaning, parts-of-speech category and the like. In some examples, cross validation of synsets may minimize or eliminate lemmas that do not reflect the intent/meaning of the original test utterance sample. In addition, the elimination of the lemmas may reserve computing resources and/or decrease the computing operations used for sentence similarity analysis or other subsequent steps.

Alternatively or in addition, the test utterance may include multiple sample tokens. Each of the sample tokens may provide multiple lemmas. In some examples, a lemma extracted from a first sample token may match a second sample token. Alternatively or in addition, the lemmas generated for a particular sample token may include a lemma with text that substantially matches the particular sample token. The lemma may be filtered or discarded to conserve computing resources for generating and/or strong test utterance samples. For example, removing unnecessary or duplicative lemmas may result in a lower number of generated test utterances that achieve the same test coverage. Thus, the time to generate a batch of test utterances for a test case is decreased and the storage requirements for the test utterances is decreased. Thus, test coverage may be maximized while test time and storage demands are minimized.

The VAT pipeline 106 may determine whether cross validation is successful and the samples tokens from the original test utterance sample are included in the synsets of the extracted lemmas (426). If cross validation is unsuccessful and/or the samples tokens from the original test utterance sample are not included in the synsets of the extracted lemmas, then one or more lemmas may be discarded (418).

The VAT pipeline 106 may generate a new test utterance sample (428). The VAT pipeline 106 may replace one or more sample tokens in the test utterance sample with one or more extracted lemmas. In an example, the test utterance sample may include "When did I make my last payment." The VAT pipeline 106 may, as described herein, may determine that a lemma for the token "make" includes "perform". The VAT pipeline 106 may replace the token "make" with the lemma "perform" to generate the new test utterance "When did I perform my last payment?".

The VAT pipeline 106 may generate the semantic relation metric (430), as described in reference to FIGS. 2 and 3. The VAT pipeline 106 may determine whether the semantic relationship metric is higher than a threshold similarity metric similarity metric value (432). The threshold similarity metric value may include a tunable threshold that defines which generated test utterances should be saved and which should be discarded. Raising the threshold metric value may increase the accuracy of the test results. Decreasing the threshold may increase the number of test utterances for wider test coverage. The threshold metric value may be provided via a user interface. In some examples, particular test contexts may have threshold metric values depending on the linguistic and semantic make up of the virtual agent(s) under test. Accordingly, various threshold metric values may be associated with context identifiers to select an appropriate threshold value depending on the virtual agent under test.

In response to the semantic relation metric being greater than the threshold similarity metric value, the VAT pipeline 106 may store the new test utterance for testing the virtual agent 104 (434). For example, the test utterance may be associated with a context identifier, a virtual agent identifier, a group identifier, or some other identification that allows the new test utterance to be selected for testing one or more virtual agents.

In response to the semantic relation metric being less than the threshold metric value, the VAT pipeline 106 may discard the generated test utterance (436). Alternatively or in addition, the VAT pipeline 106 may add the generated test utterance to a test utterance restriction set. After generating the new test utterance, the VAT pipeline 106 may determine whether the new test utterance is included in the test utterance restriction set and, if so, discard the new test utterance. In some examples, test utterances may be manually entered into the restriction set in order to prevent certain test utterances from being used to test the virtual agent 104.

Thus, testing accuracy and for the virtual agent may be improved as relevant test input is generated. Moreover, processing time for performing the test may be reduced as less incorrect results, such as false positives and negatives, are minimized.

The logic illustrated in the flow diagrams may include additional, different, or fewer operations than illustrated. The operations illustrated may be performed in an order different than illustrated.

The system 100 may be implemented with additional, different, or fewer components than illustrated. Each component may include additional, different, or fewer components. For example, the system 100 may include only the VAT pipeline 106. In other examples, the system 100 may include additional or alternative components, such as the test compiler 109, the test repository 107, the corpus repository 111, the VA driver 110, the VA trainer 112, the test environment interface 114, the virtual agent test environment 102, the virtual agent 104

Figure 5:
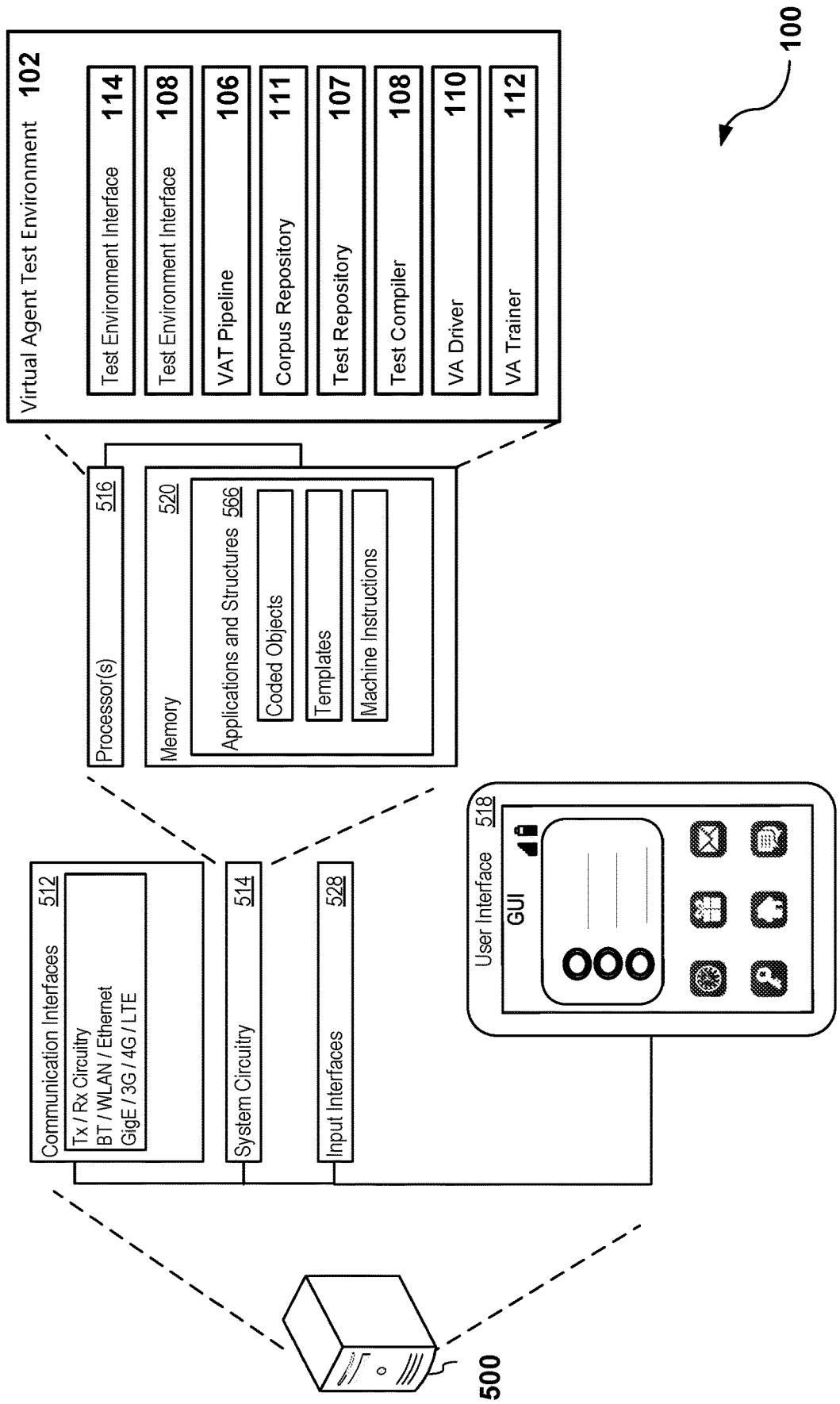
FIG. 5 illustrates an example of a computer environment for a system.

FIG. 5 illustrates an example of a computer environment 500 for the system 100. The computer environment 500 may include a hardware platform for the virtual agent test environment 102, the virtual agent 104, and/or any subcomponent therein. The computer environment 500 may include communication interfaces 512, input interfaces 528 and/or system circuitry 514. The system circuitry 514 may include a processor 516 or multiple processors. Alternatively or in addition, the system circuitry 514 may include memory 520.

The processor 516 may be in communication with the memory 520. In some examples, the processor 516 may also be in communication with additional elements, such as the communication interfaces 512, the input interfaces 528, and/or the user interface. Examples of the processor 516 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 516 may be one or more devices operable to execute logic. The logic may include computer executable instructions or computer code stored in the memory 520 or in other memory that when executed by the processor 516, cause the processor 516 to perform the features implemented by the logic of the VAT pipeline 106, the test compiler 109, the test repository 107, the corpus repository 111, the VA driver 110, the VA trainer 112, the test environment interface 114, the virtual agent test environment 102, the virtual agent 104, and/or the system 100. The computer code may include instructions executable with the processor 516.

The memory 520 may be any device for storing and retrieving data or any combination thereof. The memory 520 may include non-volatile and/or volatile memory, such as a random access memory (RAM), a read-only memory (ROM), an erasable programmable read-only memory (EPROM), or flash memory. Alternatively or in addition, the memory 520 may include an optical, magnetic (hard-drive), solid-state drive or any other form of data storage device. The memory 520 may include at least one of the VAT pipeline 106, the test compiler 109, the test repository 107, the corpus repository 111, the VA driver 110, the VA trainer 112, the test environment interface 114, the virtual agent test environment 102, the virtual agent 104, and/or the system 100. In addition, the memory may include any other component or sub-component of the system 100 described herein.

The user interface 518 may include any interface for displaying graphical information. The system circuitry 514 and/or the communications interface(s) 512 may communicate signals or commands to the user interface 518 that cause the user interface to display graphical information. Alternatively or in addition, the user interface 518 may be remote to the system 100 and the system circuitry 514 and/or communication interface(s) may communicate instructions, such as HTML, to the user interface to cause the user interface to display, compile, and/or render information content. In some examples, the content displayed by the user interface 518 may be interactive or responsive to user input. For example, the user interface 518 may communicate signals, messages, and/or information back to the communications interface 512 or system circuitry 514.

The system 100 may be implemented in many different ways. In some examples, the system 100 may be implemented with one or more logical components. For example, the logical components of the system 100 may be hardware or a combination of hardware and software. The logical components may include the VAT pipeline 106, the test compiler 109, the test repository 107, the corpus repository 111, the VA driver 110, the VA trainer 112, the test environment interface 114, the virtual agent test environment 102, the virtual agent 104, and/or other components and subcomponents of the system 100 described herein. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 520, for example, that comprises instructions executable with the processor 516 or other processor to implement one or more of the features of the logical components. When any one of the logical components includes the portion of the memory that comprises instructions executable with the processor 516, the component may or may not include the processor 516. In some examples, each logical component may just be the portion of the memory 520 or other physical memory that comprises instructions executable with the processor 516, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The systems and methods described herein may be related to at least to the following aspects:

1. A system comprising:
   a processor, the processor configured to:
   obtain a test utterance sample from test utterance samples configured to test a virtual agent;
   tokenize the test utterance sample into sample tokens;
   determine, based on a natural language processing framework, a synonymous set (synset) for at least one of the sample tokens, the synset comprising lemma tokens that are synonymous with the at least one of the sample tokens;
   obtain a contextual corpus comprising corpus tokens;
   select, from the lemma tokens, a lemma token that is included in the corpus tokens;
   generate a new test utterance comprising the selected lemma token;
   generate, based on the natural language processing framework, a semantic relation metric indicative of semantic correspondence between the new test utterance and the test utterance sample;
   determine whether the semantic relation metric is greater than a predetermined threshold value;
   insert, in response to the semantic relation metric being greater than the predetermined threshold value, the new test utterance in a test repository; and
   communicate the new test utterance to the virtual agent to test the virtual agent based on the new test utterance.

2. The system of aspect 1, wherein to determine, based on the natural language processing framework, the synset for at least one of the sample tokens, the processor is further configured to:
   tag each of the sample tokens with a corresponding part of speech (POS) tag;
   identify, from the tagged sample tokens, at least one of the sample tokens tagged with the corresponding POS tag that is indicative of a stop word;
   filter the sample tokens by removing the at least one of the sample tokens tagged with the corresponding POS tag indicative of the stop word; and
   determine, based on the natural language processing framework, the synset based on at least one remaining sample token of the filtered sample tokens.

3. The system of any of aspects 1 to 2, wherein to select, from the lemma tokens, a lemma token that is included in corpus tokens, the processor is further configured to:
   generate a frequency distribution of the corpus tokens; and
   select, from the lemma tokens, the lemma token in response to the lemma token corresponding to a corpus token associated with a greatest frequency in the frequency distribution.

4. The system of any of aspects 1 to 3, wherein to generate the new test utterance comprising the lemma tokens, the processor is further configured to:
   generate a frequency distribution of the corpus tokens.
   identify at least one of the sample tokens that corresponds to at least one of the corpus tokens;
   select, from the at least one of the sample tokens, a sample token that corresponds to a corpus token that is associated with a frequency value that is greater than a threshold value; and
   replace the selected sample token with the lemma token.

5. The system of any of aspects 1 to 4, further comprising:
   receive a test result in response to communicating the new test utterance to the virtual agent;
   determine that the virtual agent failed a test based on a comparison of the test result with the expected test result; and
   retrain a trained corpus for the virtual agent based on the new test utterance.

6. The system of any of aspects 1 to 5, wherein the processor is further configured to:
   receive a context identifier associated with the contextual corpus;
   select computer-generated test utterances based on the contextual corpus;
   communicate the test new utterance to the virtual agent;
   receive a test result from the virtual agent;
   compare the test result with an expected test result; and
   flag, in response to the received test result not corresponding to the expected test result, the new test utterance in the test repository.

7. The system of any of aspects 1 to 6, wherein to obtain the contextual corpus, the processor is further configured to:
   receive a web address corresponding to a source of the contextual corpus; and
   access the contextual corpus from a remote server based on the web address.

8. A method, comprising:
   obtaining a test utterance sample from test utterance samples configured to test a virtual agent;
   tokenizing the test utterance sample into sample tokens;
   determining, based on a natural language processing framework, a synonymous set (synset) for at least one of the sample tokens, the synset comprising lemma tokens that are synonymous with the at least one of the sample tokens;
   obtaining a contextual corpus comprising corpus tokens;
   selecting, from the lemma tokens, a lemma token that is included in the corpus tokens;
   generating a new test utterance comprising the selected lemma token;
   generating, based on the natural language processing framework, a semantic relation metric indicative of semantic correspondence between the new test utterance and the test utterance sample;

determining the semantic relation metric is greater than a threshold value;

inserting, in response to the semantic relation metric being greater than the threshold value, the new test utterance in a test repository; and testing the virtual agent based on the new test utterance.

9. The method of aspect 8, wherein testing the virtual agent based on the new test utterance further comprises:

receiving a context identifier corresponding to the virtual agent, the context identifier indicative of a natural language context of the virtual agent;

compiling computer-generated test utterances associated with the context identifier; and communicating the computer-generated test utterances to the virtual agent.

10. The method of any of aspects 8 to 9, wherein testing the virtual agent based on the test utterance further comprises:

communicating the new test utterance to the virtual agent, the new test utterance associated with an expected test result;

receiving a test result in response to communicating the new test utterance to the virtual agent;

determining that the virtual agent failed a test based on a comparison of the test result with the expected test result; and retraining a trained corpus of the virtual agent based on the new test utterance.

11. The method of any of aspects 8 to 10, wherein obtaining the contextual corpus comprising the corpus tokens further comprises:

identifying a context identifier associated with an identifier of the virtual agent; and identifying, in a corpus repository, the contextual corpus based in the context identifier, wherein the contextual corpus is associated with the contextual corpus in the corpus repository.

12. The method of any of aspects 8 to 11, further comprising:

discarding, from the lemmas, a lemma that correspond to corpus tokens associated with a frequency below a first threshold value;

selecting sample tokens that correspond to corpus tokens associated with a frequency above a second threshold value; and replacing at least one of the sample tokens with at least one of the lemmas that were not discarded.

13. The method of aspect 12, further comprising:

receiving adjustments parameters corresponding to at least one of the first threshold value or the second threshold value; and adjusting the at least one of the first threshold value or the second threshold value based on the adjustment parameters.

14. The method of any of aspects 8 to 13, wherein testing the virtual agent further comprises:

communicating the new test utterance to the virtual agent;

flagging, in response to an expected test result not corresponding to an actual test result, the new test utterance in the test repository;

receiving annotations configured to cause the natural language processing framework to retrain a corpus for the virtual agent;

annotating the new test utterances based on the annotations; and communicating the annotated new test utterance to the virtual agent.

15. A non-transitory computer readable storage medium, comprising:

instructions executable by a processor, the instructions configured to cause the processor to:

obtain a test utterance sample configured to test a virtual agent;

tokenize the test utterance sample into sample tokens;

determine, based on a natural language processing framework, a synonymous set (synset) for at least one of the sample tokens, the synset comprising lemma tokens that are synonymous with the at least one of the sample tokens;

obtain a contextual corpus comprising corpus tokens;

select, from the lemma tokens, a lemma token that is included in the corpus tokens;

generate a new test utterance comprising the selected lemma token;

generate, based on the natural language processing framework, a semantic relation metric indicative of semantic correspondence between the new test utterance and the test utterance sample;

determine the semantic relation metric is greater than a predetermined threshold value;

insert, in response to the semantic relation metric being greater than the predetermined threshold value, the new test utterance in a test repository; and communicate the new test utterance to the virtual agent to test the virtual agent based on the new test utterance.

16. The non-transitory computer readable storage medium of aspect 15, wherein to determine, based on the natural language processing framework, the synset for at least one of the sample tokens, the instructions further cause the processor to:

tag each of the sample tokens with a corresponding part of speech (POS) tag;

identify at least one of the sample tokens tagged with the corresponding POS tag that is indicative of a stop word;

filter the sample tokens by removing the at least one of the sample token tagged with the corresponding POS tag indicative of the stop word; and determine, based on the natural language processing framework, the synset based on at least one remaining sample token included in the filtered sample tokens.

17. The non-transitory computer readable storage medium of any of aspects 15 to 16, wherein to select, from the lemma tokens, the lemma token that is included in the corpus tokens, the instructions further cause the processor to:

generate a frequency distribution of the corpus tokens.

select a set of lemma token included in the corpus tokens;

determine, based on the frequency distribution, respective frequency values of the selected set of lemma tokens; and select, from the selected set of lemma tokens, the lemma token in response to the lemma token being associated with a greatest one of the respective frequency values.

18. The non-transitory computer readable storage medium of any of aspects 15 to 17, wherein to generate the new test utterance comprising the lemma tokens, the instructions further cause the processor to:

generate a frequency distribution of the corpus tokens.

identify at least one of the sample tokens that corresponds to at least one of the corpus tokens;

select, from the at least one of the sample tokens, a sample token that corresponds to a corpus token that is associated with a frequency value greater than a threshold value; and replace the selected sample token with the lemma token.

19. The non-transitory computer readable storage medium of any of aspects 15 to 18, wherein the instructions further cause the processor to:

receive a test result in response to communicating the new test utterance to the virtual agent;

determine that the virtual agent failed a test based on a comparison of the test result with the expected test result; and retrain a trained corpus of the virtual agent based on the new test utterance.

20. The non-transitory computer readable storage medium of any of aspects 15 to 19, wherein the instructions further cause the processor to:

receive a context identifier associated with the contextual corpus;

select computer-generated test utterances based on the contextual corpus;

communicate the test new utterance to the virtual agent;

receive a test result from the virtual agent;

compare the test result with an expected test result; and flag, in response to the received test result not corresponding to the expected test result, the new test utterance in the test repository.

What is claimed is:

1. A system comprising:
a processor, the processor configured to:
obtain a test utterance sample from test utterance samples configured to test a virtual agent;
tokenize the test utterance sample into sample tokens;
determine, based on a natural language processing framework, a synonymous set (synset) for at least one of the sample tokens, the synset comprising lemma tokens that are synonymous with the at least one of the sample tokens;
obtain a contextual corpus comprising corpus tokens;
select, from the lemma tokens, a subset of lemma tokens that are included in the corpus tokens;
generate a plurality of new test utterances; each of the new test utterances having a same intent or meaning or both same intent and same meaning as the test utterance sample and comprising one or more lemma tokens from the subset of lemma tokens;
generate, based on the natural language processing framework, a semantic relation metric indicative of semantic correspondence between the plurality of new test utterances and the test utterance sample;
determine whether the semantic relation metric is greater than a predetermined threshold value for each of the plurality of new test utterances;
insert, in response to the semantic relation metric being greater than the predetermined threshold value, a set of the new test utterances in a test repository; and
communicate the set of the new test utterances to the virtual agent to test a response by the virtual agent to each new test utterance in the set of the new test utterances.

2. The system of claim 1, wherein to determine, based on the natural language processing framework, the synset for at least one of the sample tokens, the processor is further configured to:
tag each of the sample tokens with a corresponding part of speech (POS) tag;
identify, from the tagged sample tokens, at least one of the sample tokens tagged with the corresponding POS tag that is indicative of a stop word;
filter the sample tokens by removing the at least one of the sample tokens tagged with the corresponding POS tag indicative of the stop word; and
determine, based on the natural language processing framework, the synset based on at least one remaining sample token of the filtered sample tokens.

3. The system of claim 1, wherein to select, from the lemma tokens, the subset of lemma tokens that are included in corpus tokens, the processor is further configured to:
generate a frequency distribution of the corpus tokens; and
select, from the lemma tokens, the subset of lemma tokens in response to the lemma tokens in the subset of lemma tokens corresponding to corpus tokens above a threshold in the frequency distribution.

4. The system of claim 1, wherein to generate the plurality of new test utterances, the processor is further configured to:
generate a frequency distribution of the corpus tokens;
identify at least one of the sample tokens that corresponds to at least one of the corpus tokens;
select, from the at least one of the sample tokens, a sample token that corresponds to a corpus token that is associated with a frequency value that is greater than a threshold value; and
replace the selected sample token with a lemma token from the subset of lemma tokens.

5. The system of claim 1, further comprising:
receive a plurality of respective test results in response to communicating the set of the new test utterances to the virtual agent;
determine that the virtual agent failed a test based on a comparison of the test results with expected test results; and
retrain a trained corpus for the virtual agent based on the set of the new test utterances.

6. The system of claim 1, wherein the processor is further configured to:
receive a context identifier associated with the contextual corpus;
select computer-generated test utterances based on the contextual corpus;
communicate the computer-generated test utterances to the virtual agent;
receive test results from the virtual agent;
compare the test results with expected test results; and
flag, in response to the received test results not corresponding to the expected test results, the computer-generated test utterances in the test repository.

7. The system of claim 1, wherein to obtain the contextual corpus, the processor is further configured to:
receive a web address corresponding to a source of the contextual corpus; and
access the contextual corpus from a remote server based on the web address.

8. A method, comprising:
obtaining a test utterance sample from test utterance samples configured to test a virtual agent;
tokenizing the test utterance sample into sample tokens;
determining, based on a natural language processing framework, a synonymous set (synset) for at least one of the sample tokens, the synset comprising lemma tokens that are synonymous with the at least one of the sample tokens;
obtaining a contextual corpus comprising corpus tokens;
selecting, from the lemma tokens, a subset of lemma tokens that are included in the corpus tokens;
generating a plurality of new test utterances, each of the plurality of new test utterances comprising at least one lemma token included in the subset of lemma tokens;
generating, based on the natural language processing framework, a semantic relation metric indicative of semantic correspondence between the new test utterances and the test utterance sample;

determining the semantic relation metric is greater than a threshold value for only a portion of the new test utterances;

inserting, in response to the semantic relation metric being greater than the threshold value, the portion of the new test utterances in a test repository; and testing the virtual agent based on the portion of the new test utterances.

9. The method of claim 8, wherein testing the virtual agent based on the portion of the new test utterances further comprises:

receiving a context identifier corresponding to the virtual agent, the context identifier indicative of a natural language context of the virtual agent;

compiling computer-generated test utterances associated with the context identifier; and communicating the computer-generated test utterances to the virtual agent.

10. The method of claim 8, wherein testing the virtual agent based on the portion of the new test utterances further comprises:

communicating the portion of the new test utterances to the virtual agent, the portion of the new test utterances associated with an expected test result;

receiving, from the virtual agent, a test result responsive to a respective new test utterance in the portion of the new test utterances;

determining that the virtual agent failed a test based on a comparison of the test result with the expected test result; and retraining a trained corpus of the virtual agent based on the portion of the new test utterances.

11. The method of claim 8, wherein obtaining the contextual corpus comprising the corpus tokens further comprises:

identifying a context identifier associated with an identifier of the virtual agent; and identifying, in a corpus repository, the contextual corpus based in the context identifier, wherein the contextual corpus is associated with the contextual corpus in the corpus repository.

12. The method of claim 8, further comprising:

discarding, from the subset of lemma tokens, a lemma token that corresponds to corpus tokens associated with a frequency below a first threshold value;

selecting sample tokens that correspond to corpus tokens associated with a frequency above a second threshold value; and replacing at least one of the sample tokens with at least one of the lemma tokens that were not discarded.

13. The method of claim 12, further comprising:

receiving adjustments parameters corresponding to at least one of the first threshold value or the second threshold value; and adjusting the at least one of the first threshold value or the second threshold value based on the adjustment parameters.

14. The method of claim 8, wherein testing the virtual agent further comprises:

communicating the portion of the new test utterances to the virtual agent;

flagging, in response to an expected test result not corresponding to an actual test result, the portion of the new test utterances in the test repository;

receiving annotations configured to cause the natural language processing framework to retrain a corpus for the virtual agent;

annotating the portion of the new test utterances based on the annotations; and communicating the annotated portion of the new test utterances to the virtual agent.

15. A non-transitory computer readable storage medium, comprising:

instructions executable by a processor, the instructions configured to cause the processor to:

obtain a test utterance sample configured to test a virtual agent;

tokenize the test utterance sample into sample tokens;

determine, based on a natural language processing framework, a synonymous set (synset) for at least one of the sample tokens, the synset comprising lemma tokens that are synonymous with the at least one of the sample tokens;

obtain a contextual corpus comprising corpus tokens;

select, from the lemma tokens, a subset of the lemma tokens that are included in the corpus tokens;

generate a plurality of new test utterances, each of the new test utterances comprising at least one of the lemma tokens included in the subset;

generate, based on the natural language processing framework, a respective semantic relation metric for each of the new test utterances, the respective semantic relation metric indicative of semantic correspondence between each of the new test utterances and the test utterance sample;

determine the semantic relation metric is greater than a predetermined similarity threshold value for similar new test utterances, the similar new test utterances being identified as similar to the test utterance sample by the predetermined similarity threshold value;

insert, in response to the semantic relation metric being greater than the predetermined similarity threshold value, the similar new test utterances in a test repository; and communicate the similar new test utterances to the virtual agent to test the virtual agent based on the similar new test utterances.

16. The non-transitory computer readable storage medium of claim 15, wherein to determine, based on the natural language processing framework, the synset for at least one of the sample tokens, the instructions further cause the processor to:

tag each of the sample tokens with a corresponding part of speech (POS) tag;

identify at least one of the sample tokens tagged with the corresponding POS tag that is indicative of a stop word;

filter the sample tokens by removing the at least one of the sample tokens tagged with the corresponding POS tag indicative of the stop word; and determine, based on the natural language processing framework, the synset based on at least one remaining sample token included in the filtered sample tokens.

17. The non-transitory computer readable storage medium of claim 15, wherein to select, from the lemma tokens, the subset of the lemma tokens that are included in the corpus tokens, the instructions further cause the processor to:

generate a frequency distribution of the corpus tokens;

determine, based on the frequency distribution, respective frequency values of the lemma tokens in the subset of the lemma tokens; and select, from the subset of the lemma tokens, a highest ranked lemma token, the highest ranked lemma token being associated with a maximum one of the respective frequency values.

18. The non-transitory computer readable storage medium of claim 15, wherein to generate the plurality of new test utterances, the instructions further cause the processor to:
generate a frequency distribution of the corpus tokens;
identify at least one of the sample tokens that corresponds to at least one of the corpus tokens;
select, from the at least one of the sample tokens, a sample token that corresponds to a corpus token that is associated with a frequency value greater than a threshold value; and
replace the selected sample token with a lemma token from the subset of the lemma tokens.

19. The non-transitory computer readable storage medium of claim 15, wherein the instructions further cause the processor to:
receive a test result in response to communicating the similar new test utterances to the virtual agent;
determine that the virtual agent failed a test based on a comparison of the test result with an expected test result associated with the similar new test utterances; and
retrain a trained corpus of the virtual agent based on the similar new test utterances.

20. The non-transitory computer readable storage medium of claim 15, wherein the instructions further cause the processor to:
receive a context identifier associated with the contextual corpus;
select computer-generated test utterances based on the contextual corpus;
communicate the computer-generated test utterances to the virtual agent;
receive a test result from the virtual agent;
compare the test result with an expected test result; and
flag, in response to the received test result not corresponding to the expected test result, the computer-generated test utterances in the test repository.

* * * * *